United States Patent [19]
Kirchmeyer et al.

[11] Patent Number: 5,900,454
[45] Date of Patent: May 4, 1999

[54] AQUEOUS DISPERSIONS, PROCESS FOR THE PRODUCTION THEREOF AND USE THEREOF

[75] Inventors: Stephan Kirchmeyer, Leverkusen; Alexander Karbach, Krefeld, both of Germany; Raymond Audenaert, Hamme, Belgium

[73] Assignees: Bayer Aktiengesellschaft, Leverkusen, Germany; Bayer Antwerpen N.V., Antwerpen, Belgium

[21] Appl. No.: 08/668,172

[22] Filed: Jun. 21, 1996

[30] Foreign Application Priority Data

Jun. 28, 1995 [DE] Germany .......................... 195 23 511

[51] Int. Cl.$^6$ .................. C08J 3/00; C08L 33/00
[52] U.S. Cl. .................. 524/522; 524/531; 524/533; 524/536; 523/209; 523/219; 525/240; 525/285; 525/304; 428/375; 428/285; 428/392; 428/441; 428/523
[58] Field of Search ...................... 524/522, 531, 524/533, 536; 525/285, 301, 304, 240, 209, 219; 523/209, 219; 428/375, 391, 378, 392, 426, 429, 441

[56] References Cited

U.S. PATENT DOCUMENTS

| | | |
|---|---|---|
| 3,433,777 | 3/1969 | Brunson . |
| 3,480,580 | 11/1969 | Joyner et al. . |
| 3,655,353 | 4/1972 | Nalley et al. . |
| 3,882,068 | 5/1975 | Swartz . |
| 5,030,682 | 7/1991 | Nomura et al. .......................... 524/527 |
| 5,130,197 | 7/1992 | Temple . |

FOREIGN PATENT DOCUMENTS

| | | |
|---|---|---|
| 0635462 | 1/1995 | European Pat. Off. . |
| 4305727 | 9/1994 | Germany . |

OTHER PUBLICATIONS

Emulsification of EPOLENE® Waxes, pp. 1–18.
T. Haruna, et al, A New Organophosphorous Type Nucleating/Clarifying Agent for Polypropylene, pp. 2029–2033.

*Primary Examiner*—William Krynski
*Assistant Examiner*—J. M. Gray
*Attorney, Agent, or Firm*—Sprung Kramer Schaefer & Briscoe

[57] ABSTRACT

Aqueous dispersions comprising emulsified polyolefins and metal salts of phosphoric acid esters which are useful for sizing glass fibers.

10 Claims, No Drawings

AQUEOUS DISPERSIONS, PROCESS FOR THE PRODUCTION THEREOF AND USE THEREOF

BACKGROUND OF THE INVENTION

The present invention relates to aqueous dispersions containing modified polyolefin as their principal constituents, to a process for the production thereof and to the use thereof for the surface modification of solids, in particular for sizing glass fibers.

It is known that the properties of composites made from glass fibers and polymers are to a great extent influenced by the shear strength between the glass fibers and the polymers surrounding the glass fibers, the so-called matrix polymers. The task of the glass fiber size is to create this adhesion between the glass fibers and the matrix polymer, and moreover to ensure the production and processing properties of the glass fibers. The sizes used are compositions prepared from water, polymeric binders (so-called film formers), coupling agents, lubricants, anti-static agents and further auxiliary substances, wherein the formulations of the sizes must be optimized for the particular polymer matrix. Generally, the binders used are organic, water-dispersible or soluble polyvinyl acetate, polyester, polyester epoxide, polyurethane, polyacrylate, polyolefin resins or mixtures thereof.

It is in principle highly problematic to reinforce polyolefins with glass fibers due to the chemical inertness and low polarity of polyolefins. Glass fibers have relatively high surface polarity and are thus largely incompatible with polyolefins. Consequently, polyolefin dispersions (BE 750 649, BE 807 979 and U.S. Pat. No. 3,480,580) are virtually exclusively used as the film formers for glass fibers suitable for polyolefins. Other film formers, for example containing polyurethane, vinyl acetate or epoxide are, in contrast, incompatible with polyolefins and are unsuitable as they prevent any bond between the fiber and matrix. In these cases, the composites produced from glass fibers and polyolefins exhibit deficient mechanical properties, such as, for example, tensile and flexural strength or impact strength.

There is, however, demand from the market for glass fibers which are also suitable for reinforcing polyolefins and which, in comparison with the prior art, offer improved properties, in particular improved tensile and flexural strength, of the polyolefin matrix.

The object of the invention is thus to provide a dispersion which is suitable for coating the surface of solids, in particular for sizing glass fibers, which dispersion increases compatibility between the surface of the solid and the matrix olefin and so improves adhesive properties.

SUMMARY OF THE INVENTION

It surprisingly proved possible to achieve this object with an aqueous dispersion containing an emulsified polyolefin and metal salts of a phosphorus ester. This was all the more surprising, as it had hitherto only been known to add metal salts of phosphoric acid esters to polyolefins in order to improve their optical properties, in particular as films (T. Haruna, E. Tobita, Annu. Tech., (1992), pages 2029–2034). The aqueous dispersions according to the invention improve the adhesive properties between the polyolefin and a correspondingly treated solid as well as their compatibility Conf. Soc. Plast. Eng. Thus, for example, polyolefins reinforced with glass fibers exhibit considerably better properties if the glass fibers have been treated with a size containing the aqueous dispersion according to the invention.

DESCRIPTION

The present invention provides aqueous dispersions consisting essentially of about
- a) 40 to 95 wt. % of water,
- b) 4 to 60 wt. % of emulsified polyolefin prepared from
  - b1) 60 to 95 wt. %, relative to (b), of polyolefin modified with acid groups
  - b2) 10 to 40 wt. %, relative to (b), of emulsifier and
  - b3) 1 to 7 wt. %, relative to (b), of base,
- c) 0.1 to 15 wt. % of metal salts of phosphoric acid esters of the general formula (I)

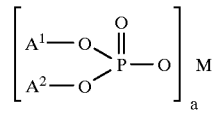

(I)

wherein
$A^1$ and $A^2$ each independently is a monofunctional hydrocarbon radical with 8 to 40 carbon atoms, or together are a difunctional hydrocarbon radical with 16 to 80 carbon atoms,
a is a number from 1 to 3 and
M is an a-valent metal ion and
d) 0 to 10 wt. % of further additives and auxiliary substances.

The present invention also provides a process for the production of the aqueous dispersions according to the invention, which process is characterized in that
- a) 40 to 95 wt. % of water,
- b) 4 to 60 wt. % of emulsified polyolefin prepared from
  - b1) 60 to 95 wt. %, relative to (b), of polyolefin modified with acid groups
  - b2) 10 to 40 wt. %, relative to (b), of emulsifier and
  - b3) 1 to 7 wt. %, relative to (b), of base,
- c) 0.1 to 15 wt. % of metal salts of phosphoric acid esters of the general formula (I)

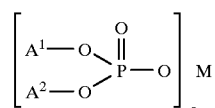

(I)

wherein
$A^1$, $A^2$ a and M have the above-stated meanings and
d) 0 to 10 wt. % of further additives and auxiliary substances are combined and then heated to temperatures of between 60° and 200° C., preferably between 90 and 190° C., and are subsequently cooled. Components a), b1) to b3), c) and optionally d) are combined, then heated and recooled, wherein a finely divided, aqueous dispersion is obtained.

Since the metal salts of the phosphoric acid esters of the formula (I) are soluble only in moderately polar solvents and are insoluble in polyolefins, it was not to be expected that the combination of these metal salts with the emulsifiable polyolefins would yield an aqueous dispersion.

The dispersions according to the invention are used for the surface modification of solids, in particular as a size component for sizing glass fibers. They are preferably used in sizes which, before application onto the glass fibers, contain 1) 2 to 20 wt. %, preferably 4 to 10 wt. %, of solids of the aqueous dispersion according to the invention, 2) 0 to 20 wt. %, preferably 0 to 10 wt. %, of solids of polyolefin, polyepoxide, polyester, polyvinyl acetate or polyurethane film formers or mixtures thereof 3) 0.1 to 10 wt. %, preferably 0.3 to 2 wt. %, of organo-functional silanes, 4) 0 to 10 wt. %, preferably 0.1 to 5 wt. %, of further conventional size constituents and 5) water to make up to 100 wt. %.

The polyolefins b1) modified with acid groups are crystalline or amorphous polyolefins which are chemically modified, i.e. which contain carboxylic acid groups, as are described, for example, in U.S. Pat. No. 3,433,777 and U.S. Pat. No. 3,480,580. Crystalline or amorphous polypropylenes containing carboxylic acid groups are preferred. Chemical modification of the polyolefins generally involves reacting the polyolefin with an unsaturated carboxylic acid and/or polycarboxylic acid or the anhydrides, chlorides, amides or esters thereof. Examples of such acids or anhydrides are maleic acid, fumaric acid, itaconic acid, acrylic acid, methacrylic acid, muconic acid, crotonic acid, maleic anhydride, itaconic anhydride etc.. Modification with maleic anhydride is preferred. One example of a usable, maleic anhydride modified polypropylene is the commercial product available from Eastman Chemical (Deutschland) GmbH under the trade name EPOLENE® E 43. The polyolefins b1) modified with acid groups are used in a quantity of 60 to 95 wt. %, preferably of 70 to 85 wt. %, relative to emulsifiable polyolefin b).

The emulsifiers b2) are generally anionic, cationic or neutral, low molecular weight, oligomeric or polymeric emulsifiers, surfactants or protective colloids, which are used in a quantity of 10 to 40 wt. %, preferably of 15 to 25 wt. %, relative to emulsifiable polyolefin b).

Examples of anionic, low molecular weight, oligomeric or polymeric emulsifiers or surfactants are alkali metal or alkaline earth metal salts of fatty acids, for example sodium salts of saturated fatty acids with 10 to 21 carbon atoms, sodium salts of unsaturated fatty acids with 12 to 18 carbon atoms, alkyl ether sulphonates, such as ethers of α-sulpho-ω-hydroxypolyethylene glycols with, for example, 1-methylphenylethylphenol, nonylphenol or alkyl ethers with 12 to 18 carbon atoms, arylalkyl sulphonates, such as naphthalenesulphonic acids provided with linear or branched butyl groups, or alkyl sulphates, such as the sodium salts of long-chain sulphuric acid alkyl esters.

Examples of cationic, low molecular weight, oligomeric or polymeric emulsifiers or surfactants are the salts of amines with 8 to 22 carbon atoms bearing long-chain alkane residues, which amines were converted with acids or by alkylation to the ammonium compounds, together with analogous phosphorus and sulphur compounds.

Examples of non-ionic oligomeric or polymeric emulsifiers or surfactants are alkyl polyglycol ethers or esters, such as ethoxylated long-chain alcohols, for example with 12 to 18 carbon atoms, bearing saturated or unsaturated bonds, ethoxylated castor oil, ethoxylated (coconut) fatty acids, ethoxylated soy bean oil, ethoxylated resin or rosin acids, ethoxylated and optionally propoxylated diethylene glycol monobutyl ether or ethoxylated alkylaryl ethers, such as ethoxylated linear and/or branched nonylphenol or octylphenol or benzylated p-hydroxybiphenyl.

Suitable emulsifiers or surfactants also include ethoxylated long-chain alkyl- or alkenylamines, lecithin, reaction products prepared from polyethylene glycols and diisocyanates and modified with long-chain alkylisocyanates, reaction products of rape seed oil and diethanolamine or ethoxylated reaction products prepared from sorbitan and long-chain alkane- or alkenecarboxylic acids.

Finally, so-called protective colloids are also suitable, such as, for example, polyvinyl alcohols or water-soluble cellulose derivatives such as methylcellulose.

Suitable bases b3) are alkali metal hydroxides, such as for example sodium or potassium hydroxide, or tertiary amines, such as for example triethylamine or N,N-dimethylethanolamine. The bases are used in a quantity of 1 to 7 wt. %, preferably of 2 to 5 wt. %, relative to b).

Formulations for polyolefin emulsions and the production thereof are known to the person skilled in the art (for example from U.S. Pat. No. 3,480,580) and are moreover described in detail in publication no. F-302 from Eastman Chemical Products Inc..

The metal salts of the phosphoric acid ester c) are compounds of the general formula (I)

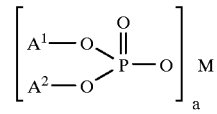

(I)

wherein
$A^1$ and $A^2$ each independently is a monofunctional hydrocarbon radical with 8 to 40 carbon atoms, or together are a difunctional hydrocarbon radical with 16 to 80 carbon atoms,
a is a number from 1 to 3 and
M is an a-valent metal ion.

Metal ions are, for example, alkali metal ions, such as sodium and potassium ions, alkaline earth metal ions, such as magnesium or calcium ions, or other metal ions, such as aluminium ions.

The metal salts are preferably
compounds of the general formula (II)

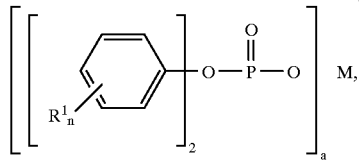

(II)

wherein,
$R^1$ is an alkyl radical with 2 to 12 carbon atoms, particularly preferably a tert.-butyl radical,
n is 1 or 2,
a is 1 to 3 and
M is an a-valent metal ion, or
compounds of the general formula (III)

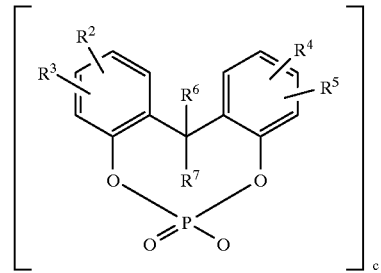

(III)

wherein
$R^2$ to $R^5$ each independently is an alkyl radical with 2 to 12 carbon atoms, particularly preferably a tert.-butyl radical in position 4 and 6,
a is 1 to 3 and
M is an a-valent metal ion and
$R^6, R^7$ each independently is a hydrogen atom or a methyl radical.

Sodium 2,2'-methylenebis(4,6-di-tert.-butylphenyl) phosphate is very particularly preferred.

The aqueous dispersion contains a quantity of 0.1 to 15 wt. %, preferably of 1 to 7 wt. %, of the metal salts of the phosphoric acid ester.

Further additives and auxiliary substances which may be considered are preferably emulsifiers, surfactants or protective colloids of the type stated above and lubricants, anti-ageing agents, anti-oxidants etc..

The aqueous dispersions according to the invention are preferably produced by combining components a) to d), heating them to temperatures of between 60° and 200° C., preferably between 90° and 190° C., and then cooling them. The temperature is preferably selected in such a manner that the modified polyolefin (b1) melts at the selected temperature. A temperature is particularly preferably selected which lies approximately 20° C. above the melting point of the modified polyolefin (b1). The process is performed in accordance with known methods as are generally used for the production of polyolefin emulsions. Details relating to the process are described, for example, in publication no. F-302 from Eastman Chemical Products Inc..

The aqueous dispersions according to the invention may be used for the surface modification of solids, such as for example calcium carbonate, talcum, silica gel, barium sulphate, calcium sulphate, kaolin, bentonite, iron oxides, titanium dioxide, zeolites, wollastonite, dolomite, zinc oxide, magnesium carbonate, molybdenum disulphide, glass and quartz. They are preferably used for sizing glass fibers.

Sizing of glass fibers is known per se to the person skilled in the art. The sizes according to the invention contain, together with the aqueous dispersions according to the invention, further binders, coupling agents, lubricants and auxiliary substances such as wetting agents and anti-static agents. The binders, coupling agents, lubricants and auxiliary substances, the process for the production of the size, the process for sizing glass fibers are known and described, for example, in K. L. Loewenstein, The Manufacturing Technology of Continuous Glass Fibres, Elsevier Scientific Publishing Corp., Amsterdam, London, New York, 1983.

Before application to the glass fibers, the size according to the invention preferably contains 1) 2 to 20 wt. %, preferably 4 to 10 wt. %, of solids of the aqueous dispersion according to the invention, 2) 0 to 20 wt. %, preferably 0 to 10 wt. %, of solids of polyolefin, polyepoxide, polyester, polyvinyl acetate or polyurethane film formers or mixtures thereof, 3) 0.1 to 10 wt. %, preferably 0.3 to 2 wt. %, of organo-functional silanes, 4) 0 to 10 wt. %, preferably 0.1 to 5 wt. %, of further conventional size constituents, and 5) water to make up to 100 wt. %.

Use of the dispersions according to the invention for the surface modification of solids, in particular for sizing glass fibers, increases compatibility between the solids and the matrix olefin and improves adhesive properties.

The following examples are intended to illustrate the invention in greater detail.

EXAMPLE 1

Production of an Aqueous Composition According to the Invention 216.0 g of maleic acid modified polypropylene (EPOLENE® E 43, commercial product of Eastman Chemical (Deutschland) GmbH), 12.0 g of sodium 2,2'-methylenebis(4,6-di-tert.-butylphenyl) phosphate, 54.0 g of nonylphenol ethoxylated with 10 mols of ethylene oxide, 10.2 g of potassium hydroxide and 1655.8 ml of water are heated in an autoclave to 170° C., stirred for 60 minutes at this temperature and cooled to 25° C. The resultant aqueous dispersion is filtered through a 50 $\mu$m woven nylon filter. No residue remains. A finely divided aqueous dispersion with a pH of 7 and a viscosity of 5 mPa.s having an indefinite storage life is obtained.

EXAMPLE 2

Use of the Aqueous Dispersion According to the Invention and Known Dispersions in Sizes for Sizing Glass Fibers The sizes described in Table 1 are applied with a kiss-roll applicator to glass fibers with a diameter of 14 $\mu$m. The glass fibers are wound into cakes (reels) and then dried for 10 hours at 130° C. Once dry, the glass fibers are chopped into 4.5 mm lengths.

EXAMPLE 3

Incorporation of the Sized Glass Fibers into Polyolefins

The components shown in Table 2 are converted into a molding composition in an extruder at an extruder temperature of 250° C. and pelletized. 80×10×4 mm test bars and tensile bars are produced from the molding compositions on a conventional injection molding machine. The bars are tested for flexural strength by DIN 53 452, tensile strength by DIN 53 455 and Izod impact strength at room temperature (ISO 180/IC).

TABLE 1

Sizes

| Size component | Glass fiber 1 (invention) | Glass fiber 2 (Comparison) |
|---|---|---|
| γ-Aminopropyltriethoxysilane (wt. %) | 0,6 | 0,6 |
| Aqueous dispersion from Example 1 (wt. % of solids) | 9,0 | — |
| Polypropylene dispersion according to US Pat. No. 3 433 777[*)] (wt. % of solids) | — | 9,0 |
| Water (wt. %) | 98,4 | 98,4 |
| Quantity of size applied in % (determined by ashing) | 1,10 | 1,05 |

TABLE 2

Molding compositions

| Component (quantities stated in parts by weight relative to a total quantity of 100 parts by weight) | A | B | Comparison A | Comparison B |
|---|---|---|---|---|
| Polypropylene HOSTALEN ® PPN 1060 natural; commercial product of Hoechst AG) | 70 | 65 | 70 | 65 |
| Modified polypropylene EXXELOR ® PO 1015; commercial product of Exxon) | — | 5 | — | 5 |
| Glass fiber 1 from Example 2 | 30 | 30 | — | — |
| Glass fiber 2 from comparative example | — | — | 30 | 30 |
| Flexural strength in MPa | 95 | 147 | 77 | 116 |
| Tensile strength in MPa | 64 | 100 | 53 | 76 |
| Impact strength in kJ/m$^2$ | 11 | 33 | 9 | 24 |

[*)]Dispersion prepared from 90 g of emulsifier (NP 7; commercial product of Bayer, Leverkusen), 360 g of EPOLENE ® E 43 (commercial product of Eastman Chemical Products Inc.), 16.92 g of potassium hydroxide and 1100 ml of water; produced in accordance with publication no. F-302 from Eastman Chemical Products Inc., page 16.

It will be understood that the specification and examples are illustrative but not limitative of the present invention and that other embodiments within the spirit and scope of the invention will suggest themselves to those skilled in the art.

We claim:

1. Aqueous dispersion consisting essentially of
   a) 40 to 95 wt. % of water,
   b) 4 to 60 wt. % of emulsified polyolefin prepared from
      b1) 60 to 95 wt. %, by weight of b), of at least one polyolefin modified with acid groups,
      b2) 10 to 40 wt. %, by weight of b), of emulsifier and
      b3) 1 to 7 wt. %, by weight of b), of a base,
   c) 0.1 to 15 wt. % of at least one metal salt of a phosphoric acid ester of the formula

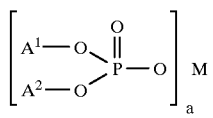

(I)

wherein
      $A^1$ and $A^2$ independently of each other represent a monofunctional hydrocarbon radical with 8 to 40 carbon atoms, or together are a difunctional hydrocarbon radical with 16 to 80 carbon atoms,
      a is an integer from 1 to 3 and
      M is an a-valent metal ion, and
   d) 0 to 10 wt. % of further additives and auxiliary substances.

2. An aqueous dispersion according to claim 1, wherein the metal salt of the phosphoric acid ester comprises sodium 2,2'-methylenebis(4,6-di-tert.-butylphenyl) phosphate.

3. A glass fiber size consisting essentially of
   i) 2 to 20 wt. % (based on the solids content) of an aqueous dispersion according to claim 1
   ii) 0 to 20 wt. % (based on the solids content) of at least one polyolefin, polyepoxide, polyester, polyvinyl acetate or polyurethane film former,
   iii) 0.1 to 10 wt. % of at least one organo-functional silane,
   iv) 0 to 10 wt. % of further conventional size constituents, and
   v) water to make 100 wt. %.

4. A glass fiber size according to claim 3, wherein in weight percent, based on the solids content,
   i) is present in an amount of 4 to 10%, and the metal salt of the phosphoric acid ester (component c)) comprises sodium 2,2'-methylenebis(4,6-di-tert.-butylphenyl) phosphate,
   ii) is present in an amount of 0 to 10%,
   iii) is present in in an amount of 0.3 to 2%, and
   iv) is present in an amount of 0.1 to 5%.

5. A polyolefinic molded article reinforced with glass fibers sized with the size of claim 4.

6. A process for the preparation of a composition according to claim 1, comprising mixing a, b, c and d, heating the resulting mixture to about 90 to 200° C., and then cooling.

7. The product produced by the process of claim 6.

8. In the sizing of glass fibers by applying thereto an effective amount of a size, the improvement wherein the size consists essentially of an aqueous dispersion according to claim 1.

9. The product produced by the process of claim 8.

10. In the sizing of glass fibers by applying thereto an effective amount of a size, the improvement wherein the size consists essentially of an aqueous dispersion according to claim 1.

UNITED STATES PATENT AND TRADEMARK OFFICE
CERTIFICATE OF CORRECTION

PATENT NO. : 5,900,454
DATED : May 4, 1999
INVENTOR(S) : Kirchmeyer, et al.

It is certified that error appears in the above-identified patent and that said Letters Patent is hereby corrected as shown below:

| | |
|---|---|
| Title Page, U.S. Patent Documents, line 5 | Delete "524/527" and substitute --524/522--. |
| Col. 8, Line 16 | After "in" and before "an" delete "in". |
| Col. 8, Line 25 | Delete claim "6" and substitute --3-- |
| Col. 8, Line 31 | Delete claim "8" and substitute --6-- |
| Col. 8, Line 35 | Delete "1" and substitute --4--. |

Signed and Sealed this

Fourth Day of April, 2000

Attest:

Attesting Officer

Q. TODD DICKINSON

Director of Patents and Trademarks